United States Patent [19]
van der Meer

[11] Patent Number: 5,761,986
[45] Date of Patent: Jun. 9, 1998

[54] APPARATUS FOR PREPARING BEVERAGES

[75] Inventor: Sytze van der Meer, Hoogeveen, Netherlands

[73] Assignee: U.S. Philips Corporation, New York, N.Y.

[21] Appl. No.: 705,570

[22] Filed: Aug. 29, 1996

[30] Foreign Application Priority Data

Aug. 30, 1995 [EP] European Pat. Off. .............. 95202345

[51] Int. Cl.$^6$ .................................................. A47J 31/46
[52] U.S. Cl. .................................................. 99/282; 99/283
[58] Field of Search ........................ 99/281, 282, 283; 426/433

[56] References Cited

U.S. PATENT DOCUMENTS

| | | |
|---|---|---|
| 2,005,764 | 6/1935 | Wilcox ........................ 219/43 |
| 4,000,396 | 12/1976 | Abel, Jr. ........................ 99/281 X |
| 4,357,520 | 11/1982 | Taylor ........................ 99/281 X |
| 4,613,745 | 9/1986 | Marotta et al. ........................ 99/282 X |
| 4,667,584 | 5/1987 | Koyama et al. ........................ 99/280 |

FOREIGN PATENT DOCUMENTS 3801896  3/1989  Germany.

*Primary Examiner*—Reginald L. Alexander
*Attorney, Agent, or Firm*—Ernestine C. Bartlett; Norman N. Spain

[57] ABSTRACT

The invention relates to an apparatus for preparing beverages, such as a coffee-maker, comprising a water reservoir (1) with a heating element (6), a filter device (2), an outlet channel (1) between the water reservoir and the filter device, a valve (19) arranged in the outlet channel, first sensor/switching means (24/18) for detecting the water temperature in the water reservoir and for opening/closing the valve (19, and second sensor/switching means (27) for turning on/off the heating element (6). In order to ensure that the heating element is turned off when the valve opens and is automatically turned on when a new coffee-making cycle is stared, the coffee-maker is characterized in that the second sensor (27) has been arranged on a wall (26) of the outlet channel (11) to detect the temperature of the water in the outlet channel and to turn on/off the heating element (6) when a preset temperature is reached.

6 Claims, 1 Drawing Sheet

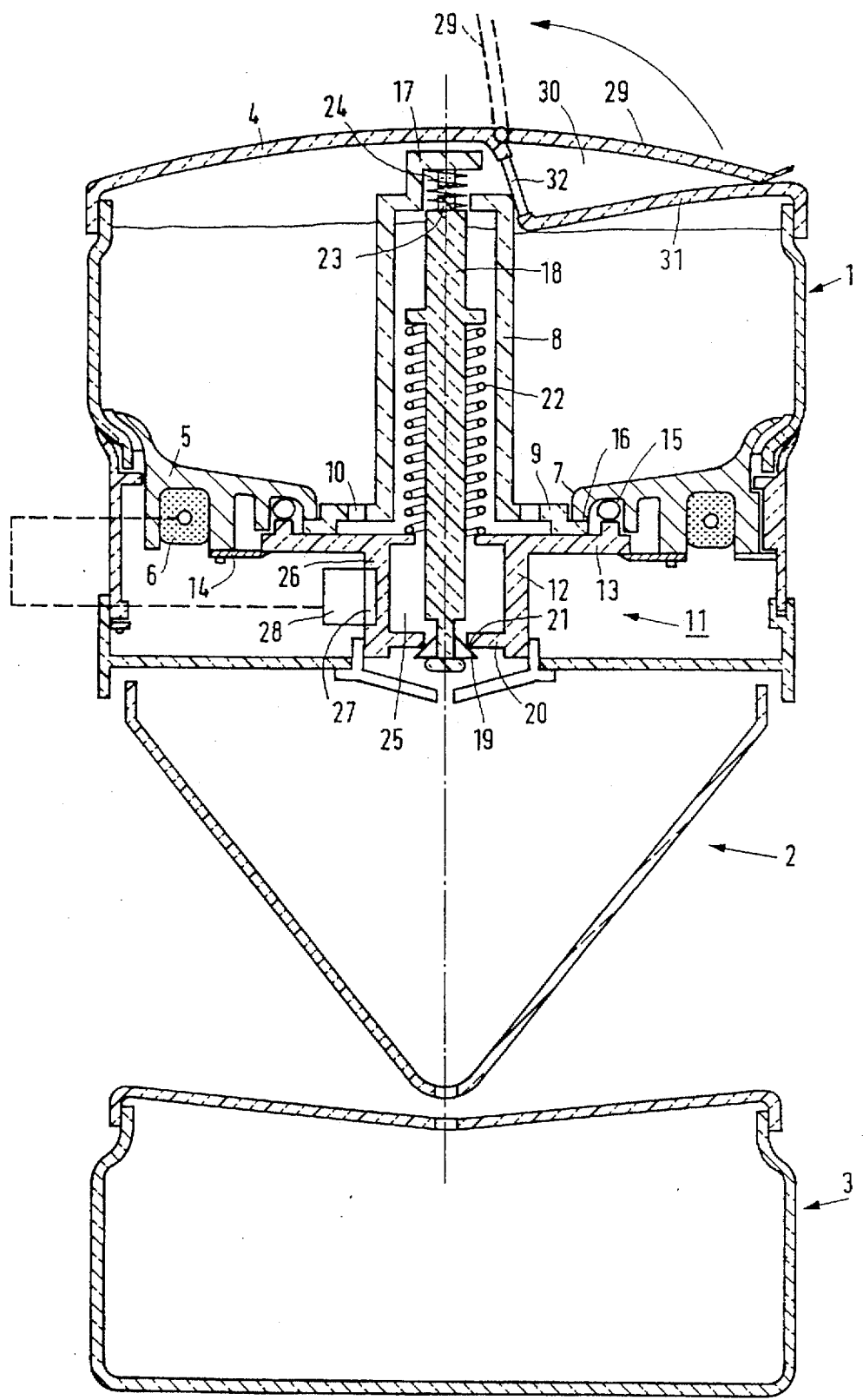

APPARATUS FOR PREPARING BEVERAGES

BACKGROUND OF THE INVENTION

The invention relates to an apparatus for preparing beverages, comprising a water reservoir with a heating element for heating water in the water reservoir, a filter device, an outlet channel connected to the water reservoir in order to convey hot water to the filter device, a valve arranged in the outlet channel, first sensor/switching means for detecting the water temperature in the water reservoir and for opening/closing the valve when a preset temperature is reached, and second sensor/switching means for turning on/off the heating element.

Such an apparatus is known from DE-C2-38 01 896. This concerns an apparatus for making tea, the water in a water reservoir being brought to the boil, after which a sensor in the water reservoir actuates a valve, which opens the passage in the outlet channel between the water reservoir and a reservoir for brewing of the tea. A steam sensor is situated in the water reservoir above the water level and is responsive to the steam developed when the water boils, to turn off the heating element and start a timer. A problem which may occur with this apparatus is that the steam sensor responds sooner than the sensor which opens the valve, as a result of which the heating element is turned off before the valve is opened. There is a possibility that the valve does not open at all and the process stops, which is obviously an undesirable situation.

SUMMARY OF THE INVENTION

It is an object of the invention to provide a solution for this problem, in order to ensure that the heating element is turned off when the valve opens and is automatically turned on when a new brewing cycle is started.

To this end, the apparatus is characterized in that the second sensor has been arranged on a wall of the outlet channel to detect the temperature of the water in the outlet channel and to turn on/off the heating element when a preset temperature is reached.

The second sensor can be arranged both upstream and downstream of the valve, viewed in the direction of flow of the water in the outlet channel. In both situations the temperature detected by the sensor will remain far below the boiling temperature of the water during heating of the water in the water reservoir and before the valve is opened. As soon as the valve is opened after boiling of the water, hot water will flow through the outlet channel past the second sensor, which turns off the heating element.

Preferably, the second sensor is disposed downstream of the valve, viewed in the direction of flow of the water through the outlet channel. After the water reservoir has been filled with cold water the outlet channel is also filled with cold water. The sensor detects the cold water and the switching means ensure that the heating element can be turned on. The cold water in the outlet channel is heated only slowly during heating of the water in the water reservoir, because this water is, in fact, situated in a separate part of the water reservoir, which only communicates with the water reservoir via small outlet openings. The water near the inlet channel is heated more slowly than the water in the water reservoir, so that the heating element is not turned off prematurely.

In a further preferred embodiment the outlet channel has been widened to form a chamber at the location of the second sensor. As a result, a larger quantity of water is present near the sensor than in the case that the channel has not been widened. Heating of the water in this chamber proceeds even more slowly, thereby ensuring that the heating element is not turned off until the valve has opened and the hot water from the water reservoir flows past the sensor.

In a further preferred embodiment the sensor is disposed in the upper part of the water reservoir and there have been provided means to achieve that always at least a part of the cold water to be poured into the water reservoir flows past the first sensor. Owing to the cold water the sensor responds immediately, so that the valve is closed and no cold water can flow to the filter device. The means may the means comprise a wall portion of a lid of the water reservoir, which wall portion forms part of a filling port and has an opening which gives access to the first sensor.

BRIEF DESCRIPTION OF THE DRAWING

The sole FIGURE of the drawing is a cross-sectional view of a coffee-maker of the invention.

DETAILED DESCRIPTION OF THE INVENTION

The invention will now be described in more detail with reference to an embodiment of a coffee-maker shown in a single drawing.

The coffee-maker has a water reservoir 1, a filter device 2 and a receptacle 3 for the coffee brew. The water reservoir 1 can be closed by means of a lid 4. A heating element 6 is situated in the aluminum bottom 5 of the water reservoir. A pipe 8 having a flange 9 has been fitted in an opening 7 in the bottom of the water reservoir. The flange has outlet openings 10 for the water from the water reservoir. The outlet channel 11 is situated underneath the flange and is basically formed by a valve housing having a flange 13. The flange 13 is secured to the bottom 5 of the water reservoir by a supporting ring 14. A sealing ring 15 is disposed between the bottom 5 and the flange 13. Thus, the flange 9 of the pipe 8 is also clamped between a rim 16 of the opening 7 in the bottom 5 and the flange 13. The pipe 8 is open at its upper end 17. A valve rod 18 extends in the pipe. The lower end of the valve rod carries a valve 19 in the form of a sealing ring adapted to cooperate with a rim 20 of an outlet opening 21 of the valve housing 12. A spring 22 pulls up the valve rod 18, as a result of which the outlet opening 21 is closed by the valve 19. A first sensor 24 in the form of a memory metal spring is disposed between the upper end 23 of the valve rod 18 and the upper end 17 of the pipe 8. However, alternatively a bimetal spring may be used. The valve rod 18 forms the switching means for the sensor 24. The valve housing 12 has a portion which has been widened to form a chamber 25. The wall 26 of the chamber carries a second sensor 27, which in conjunction with the switching means 28, which are not shown in more detail, cause the heating element to be turned on/off. The second sensor 27 and the switching means 28 can be constituted by a regular thermostat.

The coffee-maker operates as follows: The water reservoir is filled with cold water, as a result of which there is also water in the pipe 8 and the chamber 25. The outlet opening 21 is closed by the valve 19. The heating element 6 is turned on. The temperature of the water rises. During this heating phase the temperature of the first sensor 24 (memory metal spring) remains 20° to 30° lower than that of the water. As soon as the water begins to boil, the hot steam thus produced comes into contact with the sensor 24, as a result of which the temperature of this sensor rises rapidly, causing the memory metal spring to expand. The valve rod 18 is urged downward opposed by the action of the spring 22, so that the valve 19 liberates the outlet opening 21 and the hot water can flow to the filter device 2. The water in the chamber 25 is also heated by convection during the heating phase of the water in the water reservoir. However, the temperature of the water in the chamber 25 considerably lags behind the temperature of the water in the water reservoir. Therefore, the second sensor 27 on the wall 26 of the chamber 25 will not respond during the heating phase. The sensor 27 does not respond until the hot water flows through the chamber 25 and then ensures that the heating element 6 is turned off.

In its open position a hinged valve 29 mounted in the lid 4 exposes a filling port 30 to fill the water reservoir 1. A wall portion 31 disposed underneath the valve 29 forms part of the lid 4. When the water reservoir is refilled, the cold water flows over the wall portion 31, at least a part of the cold water flowing through an opening 32 in the wall portion past the first sensor 24 via the open upper end 17 of the pipe 8, as a result of which the memory metal spring contracts (becomes shorter) and the valve rod 18 is pushed up by the force of the spring 22. The valve 19 closes the outlet opening 21. This ensures that the outlet opening 21 is always closed when new coffee is to be made. This is so even if coffee is made immediately after a previous coffee-making cycle, the various parts still being hot. Moreover, the cold water in the chamber 25 will ensure that the second sensor 27 is actuated in the case that this has not yet happened as a result of normal cooling.

In order to minimize the influence of the hot water in the water reservoir on the sensor 24 (memory metal spring) and on the water in the chamber 25 and, consequently, on the second sensor 27, the pipe 8 with the flange 9, the valve housing 12 with the flange 13, and the valve rod 18 are made of a poor thermal conductor, such as plastic.

I claim:

1. An apparatus for preparing beverages, said apparatus comprising:

a) a water reservoir (1) for holding cold water to be heated to a temperature suitable for use in the preparation of a hot beverage, b) a heating element (60) situated in a wall of said reservoir for heating water in said reservoir to a desired temperature, c) a filter device (2) porous to liquids, for holding a beverage forming composition, porous to hot water, and capable of forming with hot water, a hot beverage, positioned downstream from the water reservoir, d) an outlet channel (11), provided with an outlet opening (21) positioned adjacent to a bottom portion of the reservoir for conveying hot water to the filter device through the outlet opening, e) a valve (19) arranged in the outlet channel for opening and closing the outlet opening (21), f) a first sensor/switching means (24/18), positioned in contact with the water reservoir for opening/closing the valve (19) when the temperature of the water in the water reservoir reaches a preset temperature, characterized in that a second sensor/switching means (27/28) is arranged in a wall (26) of the outlet channel(11) to detect the temperature of the water in the outlet channel and turn on/off the heating element (6) when the temperature of the water in the outlet channel (11) reaches a preset temperature.

2. An apparatus for preparing beverages, as claimed in claim 1 characterized in that the second sensor/switching means (27/28) is disposed downstream of the valve (19), viewed in the direction of flow of the water through the outlet channel.

3. An apparatus for preparing beverages, as claimed in claim 2, characterized in that the outlet channel (11) has been widened to form a chamber (25) at the location of the second temperature sensor (27).

4. An apparatus for preparing beverages, as claimed in claim 1, characterized in that the sensor (24) is disposed in the upper part of the water reservoir (1) and there have been provided means (30, 31, 32) to achieve that always at least a part of the cold water to be poured into the water reservoir (1) flows past the first sensor (24).

5. An apparatus for preparing beverages, as claimed in claim 4, characterized in that the means comprise a wall portion (31) of a lid of the water reservoir (1), which wall portion forms part of a filling port (30) and has an opening (32) which gives access to the first sensor (24).

6. An apparatus for preparing beverages, as claimed in claim 1 wherein the outlet channel (11) is made of a thermally insulating material and is connected to the water reservoir (1) by means of a thermally insulating seal (15).

* * * * *